US012355884B2

(12) United States Patent
Li et al.

(10) Patent No.: US 12,355,884 B2
(45) Date of Patent: Jul. 8, 2025

(54) NETWORK SLICE AUTHENTICATION METHOD AND COMMUNICATIONS APPARATUS (71) Applicant: Huawei Technologies Co., Ltd., Shenzhen (CN)

(72) Inventors: Fei Li, Shenzhen (CN); Bo Zhang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 763 days.

(21) Appl. No.: 17/171,675

(22) Filed: Feb. 9, 2021

(65) Prior Publication Data

US 2021/0168139 A1    Jun. 3, 2021

Related U.S. Application Data (63) Continuation of application No. PCT/CN2019/111923, filed on Oct. 18, 2019.

(30) Foreign Application Priority Data

Nov. 5, 2018   (CN) .......................... 201811307957.5
Jan. 2, 2019   (CN) .......................... 201910002319.0

(51) Int. Cl.
H04L 67/01    (2022.01)
H04L 9/32     (2006.01)
H04L 9/40     (2022.01)

(52) U.S. Cl.
CPC ........ *H04L 9/3213* (2013.01); *H04L 63/0876* (2013.01); *H04L 63/102* (2013.01); *H04L 63/20* (2013.01); *H04L 67/01* (2022.05)

(58) Field of Classification Search
CPC ....... H04L 63/20; H04L 63/102; H04L 67/01; H04L 63/0876
USPC ............................................................ 726/4
See application file for complete search history.

(56) References Cited

U.S. PATENT DOCUMENTS 10,715,327 B1 *   7/2020  Ramanujan ......... H04L 63/0838
11,419,046 B2 *   8/2022  Fiorese ................. H04L 63/108
2012/0052859 A1 * 3/2012  Cai ..................... H04L 61/4552
                                                          455/426.1

(Continued)

FOREIGN PATENT DOCUMENTS

CN    104821937 A    8/2015
CN    105659558 A    6/2016

(Continued)

OTHER PUBLICATIONS

Huawei, et al., 3GPP TSG SA WG3 (Security) Meeting #91, S3-181252, "OAuth based authorization for access to management functions," Apr. 16-20, 2018, Belgrade, Serbia, 2 pages.

(Continued)

*Primary Examiner* — Josnel Jeudy
(74) *Attorney, Agent, or Firm* — Conley Rose, P.C.

(57) ABSTRACT

A service authorization method includes receiving, by a server from a client, a request requesting an access token, where the request includes slice information, performing, by the server, authentication on the client, adding, by the server, the slice information to the access token, and sending, by the server, a response message to the client when the client is authenticated, where the response message comprises the access token.

20 Claims, 5 Drawing Sheets (56) References Cited

U.S. PATENT DOCUMENTS

| | | | |
|---|---|---|---|
| 2014/0112135 A1* | 4/2014 | Huang | H04W 48/14 |
| | | | 370/231 |
| 2016/0028737 A1 | 1/2016 | Srinivasan et al. | |
| 2018/0191568 A1* | 7/2018 | Hoffmann | G06F 9/485 |
| 2018/0206152 A1 | 7/2018 | Zhang et al. | |
| 2018/0302408 A1 | 10/2018 | Touati et al. | |
| 2019/0124561 A1* | 4/2019 | Faccin | H04W 84/00 |
| 2019/0166493 A1 | 5/2019 | You et al. | |
| 2022/0224589 A1* | 7/2022 | Das | H04L 41/0627 |

FOREIGN PATENT DOCUMENTS

| | | |
|---|---|---|
| CN | 106210042 A | 12/2016 |
| CN | 106550410 A | 3/2017 |
| CN | 107347202 A | 11/2017 |
| CN | 107666666 A | 2/2018 |
| WO | 2018009344 A1 | 1/2018 |
| WO | 2018013925 A1 | 1/2018 |
| WO | 2018049583 A1 | 3/2018 |

OTHER PUBLICATIONS

3GPP TS 24.501 V15.1.0, "3rd Generation Partnership Project; Technical Specification Group Core Network and Terminals; Non-Access-Stratum (NAS) protocol for 5G System (5GS); Stage 3 (Release 15)," Sep. 2018, 398 pages.

3GPP TS 33.501 V15.2.0, "3rd Generation Partnership Project; Technical Specification Group Services and System Aspects; Security architecture and procedures for 5G system (Release 15)", Sep. 2018, 175 pages.

* cited by examiner

NETWORK SLICE AUTHENTICATION METHOD AND COMMUNICATIONS APPARATUS

CROSS-REFERENCE TO RELATED APPLICATIONS

This application is a continuation of International Patent Application No. PCT/CN2019/111923 filed on Oct. 18, 2019, which claims priority to Chinese Patent Application No. 201910002319.0 filed on Jan. 2, 2019, which claims priority to Chinese Patent Application No. 201811307957.5 filed on Nov. 5, 2018. The disclosures of the aforementioned applications are hereby incorporated by reference in their entireties.

TECHNICAL FIELD

This application relates to the field of communications technologies, and in particular, to a network slice authorization method and a communications apparatus.

BACKGROUND

On a network deployed using a service-based architecture (SBA), for example, on a core network (CN) of a 5th generation (5G) mobile communications system, different network functions usually communicate with each other based on a client/server communication mode. A requesting party is the client, and a responding party is the server. To prevent any client from accessing the server, which brings security risks to the mobile communications system, and to support restricted access to resources of a third-party client, the SBA further supports a service authorization function. An authorization server provides the client with an access token, and the client performs function access based on the access token.

For the foregoing scenario, how to issue an access token to the client, and therefore a network security problem is not caused when the client uses the access token to access a function server, is particularly important.

SUMMARY

Embodiments of this application provide a service authorization method and a communications apparatus, to avoid a problem of network security when a client uses an obtained access token.

To achieve the foregoing objective, the embodiments of this application provide the following technical solutions.

According to a first aspect, a service authorization method is provided, including a first server receives a first request sent by a client. The first request is used to request an access token, and the first request includes slice information.

The first server performs authentication on the client.

If the client is authenticated, the first server sends a first response message to the client. The first response message includes an access token, and the access token includes the slice information.

For example, the slice information includes at least one of the following four types of information: single network slice selection assistance information (S-NSSAI), a single network slice selection assistance information list, a network slice instance (NSI) identifier (ID), or a network slice instance identifier list.

In addition, it should be further noted that the S-NSSAI is a slice type granularity, and the NSI ID indicates a specific slice. For example, common slice types include a slice of an enhanced mobile broadband (eMBB) type, a slice of a ultra-reliable low-latency communications (URLLC) type, and the like. For example, there are a plurality of instances in one type of slice, and each instance has an ID. A slice may be determined based on the ID of the slice.

It should be noted that the slice information is used to ensure that the client can access only a function server in the slice. This ensures isolation between slices and maintains network security.

It should be noted that the access token further includes an expected service name and type, a client identifier, and a client type. Optionally, the access token may further include a group identifier, and the group identifier is ID information of a group including a preset service of a preset function server. For example, the preset function server is a session management network element (or referred to as a session management server), and includes four services: a service 1, a service 2, a service 3, and a service 4. The service 1 and the service 2 form a first group, and the service 3 and the service 4 form a second group. If the client accesses the session management network element, the group identifier that needs to be accessed may be added.

In addition, optionally, the slice information in the access token may be replaced with the group identifier.

It can be learned from the foregoing that, according to the technical solutions provided in the present disclosure, the first server adds the slice information to the access token, to enable the client to access only the function server in the slice when performing function access using the access token. This ensures that the slices can be isolated from each other.

A second aspect of the present disclosure discloses a service request method, where the method includes the following.

A second server receives a second request sent by a client. The second request is used to request a function service, and the second request comprises an access token.

The second server verifies slice information in the access token.

The second server sends a verification result to the client.

Optionally, verifying, by the second server, slice information in the access token includes that the second server determines whether the slice information in the access token matches slice information stored in the second server.

In addition, optionally, the access token may include a group identifier. If the access token includes the group identifier, the second server further needs to verify the group identifier.

In addition, optionally, the access token may not include the slice information, but includes a group identifier. In this case, the second server verifies the group identifier.

In addition, it should be noted that the access token includes parameters such as an expected service name and a function type of a function server. Certainly, the second server needs to determine whether the function service required by the client is beyond a service scope recorded in the access token.

Therefore, it can be learned that according to the technical solution provided in the embodiments of the present disclosure, the second server verifies the slice information in the access token, to ensure that service access is performed in a same slice, and prevent another slice from accessing the function server. This ensures that the slices are isolated from each other.

In addition, it should be noted that if the slice information indicates a slice type, then by verifying the slice information, it can be ensured that internal network elements of slices of a same type can access each other, and network elements of slices of different types cannot access each other.

According to a third aspect, a server is provided, and the server is configured to perform the method described in the first aspect. Further, the server includes a receiving unit, an authentication unit, and a sending unit. The receiving unit is configured to receive a first request sent by a client. The first request is used to request an access token, and the first request includes slice information. The authentication unit is configured to authenticate the client. The sending unit is configured to send a first response message to the client if the client is authenticated. The first response message includes an access token, and the access token includes the slice information.

Optionally, the access token further includes an expected service name and type, a client identifier, and a client type. Certainly, the access token may further include a group identifier. Correspondingly, the first request may also include parameters listed above.

In addition, it should be further noted that the slice information is single network slice selection assistance information and/or a network slice instance identifier, or a single network slice selection assistance information list and/or a network slice instance identifier list.

In addition, it should be noted that the access token may not include the slice information, but includes the group identifier. Correspondingly, the first request should include the group identifier instead of the slice information.

According to a fourth aspect, another server is further provided. The server includes a receiving unit, a verification unit, and a sending unit. Further, the receiving unit is configured to receive a second request sent by a client. The second request is used to request a function service, and the second request includes an access token. The verification unit is configured to verify slice information in the access token. The sending unit is configured to send a verification result to the client.

Optionally, it should be noted that the verification unit is configured to determine whether the slice information in the access token matches slice information stored in a second server.

According to a fifth aspect, a server is provided, including a processor and a transceiver. The processor is coupled to the memory. The processor is configured to execute a computer program stored in the memory, to enable the server to perform the service authorization method according to any one of the first aspect and the optional implementations of the first aspect, or perform the service authorization method according to any one of the second aspect and the optional implementations of the second aspect.

According to a sixth aspect, a computer-readable storage medium is provided. The computer-readable storage medium stores a program or an instruction. When the program or the instruction runs on a computer, the computer is enabled to perform the method according to any one of the first aspect and the optional implementations of the first aspect, or perform the method according to any one of the second aspect and the optional implementations of the second aspect.

According to a seventh aspect, a computer program product is provided, including computer program code. When the computer program code is run on a computer, the computer is enabled to perform the method according to any one of the first aspect and the optional implementations of the first aspect, or perform the method according to any one of the second aspect and the optional implementations of the second aspect.

DESCRIPTION OF EMBODIMENTS

The following describes technical solutions of this application with reference to accompanying drawings.

The technical solutions in the embodiments of this application may be applied to various communications systems, for example, a 5G mobile communications system and a future communications system such as a sixth generation (6G) system or a seventh generation (7G) system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompany drawings. In addition, a combination of these solutions may be used.

In addition, in the embodiments of this application, the terms such as "for example" and "such as" are used to represent giving an example, an illustration, or a description. Any embodiment or design scheme described as an "example" in this application should not be explained as being more preferred or having more advantages than another embodiment or design scheme. Exactly, "for example" is used to present a concept in a specific manner.

In the embodiments of this application, the terms "information", "signal", "message", "channel", or "signaling" may be interchangeably used sometimes. It should be noted that expressed meanings are consistent when differences are not emphasized. In addition, the terms "of", "corresponding (or relevant)", and "corresponding" may be interchangeably used sometimes. It should be noted that expressed meanings are consistent when differences are not emphasized.

In the embodiments of this application, sometimes a subscript such as $W_1$ may be written in an incorrect form such as W1. Expressed meanings are consistent when differences between them are not emphasized.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of new service scenarios, the technical solutions provided in the embodiments of this application are also applicable to similar technical problems.

In the embodiments of this application, some scenarios are described using, as an example, a scenario in a 5G system. It should be noted that the solutions in the embodiments of this application may be further applied to another mobile communications system, and a corresponding name may also be replaced with a name of a corresponding function in the other mobile communications system.

Figure 1:
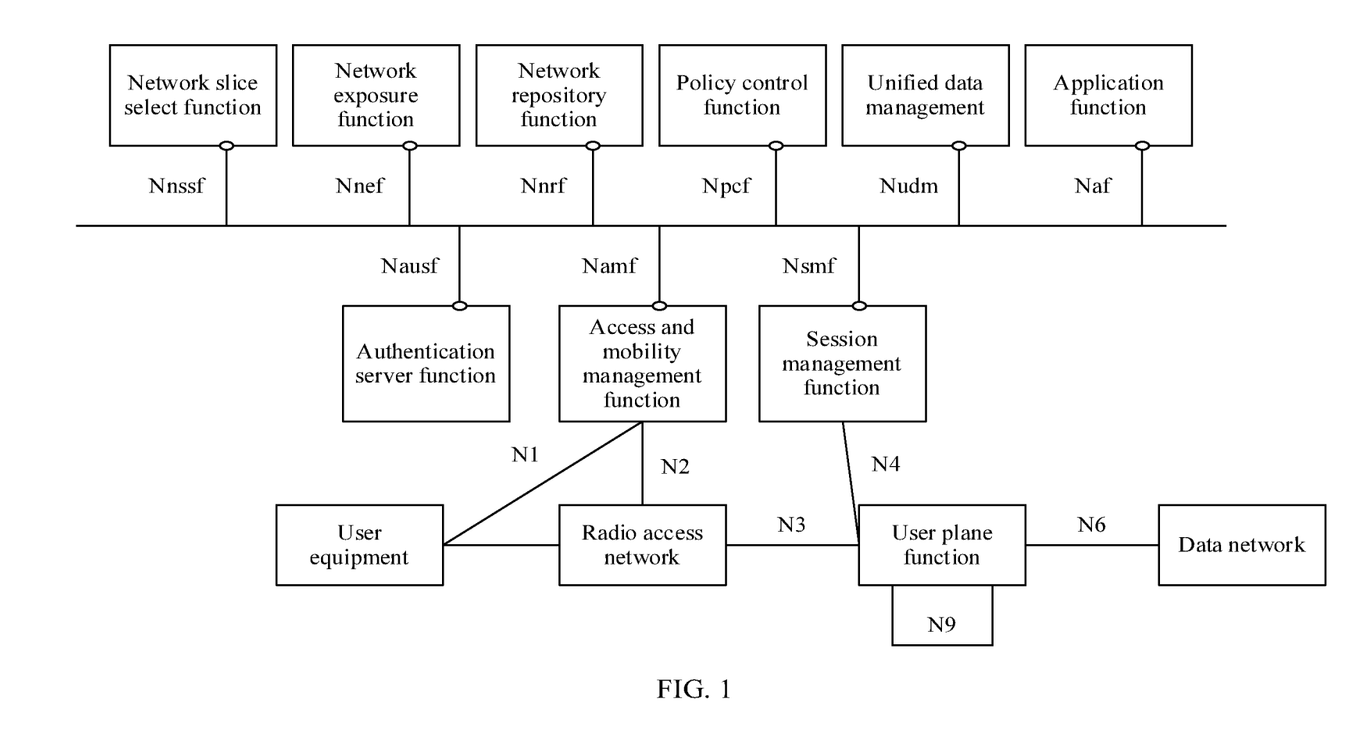
FIG. 1 is a schematic diagram of a structure of a communications system to which a service authorization method is applicable according to an embodiment of this application.

First, for ease of understanding the embodiments of this application, a communications system shown in FIG. 1 is used as an example to describe in detail a communications system to which the embodiments of this application are applicable.

As shown in FIG. 1, the communications system includes user equipment (UE), a radio access network (RAN), and a core network (CN). The user equipment may access the radio access network using an access network device such as a base station, and establish a communication connection to an external data network (DN) through the core network. The core network is mainly used for user equipment registration, security authentication, mobility management, location management, session management, data packet forwarding between the user equipment and the external data network, and the like.

The radio access network may be a next generation access network (NG-AN). The core network includes the following network functions: a session management function (SMF), an access and mobility management function (AMF), a user plane function (UPF), unified data management (UDM), a policy control function (PCF), an authentication server function (AUSF), a network slice selection function (NSSF), a network exposure function (NEF), a network repository function (NRF), an application function (AF), and the like.

It should be noted that the core network may include one or more core network devices. The core network device may be a network element configured to perform the foregoing single network function, or may be a network element configured to perform the foregoing plurality of network functions. When one core network device is configured to perform the plurality of network functions, the core network device may include one or more functional modules configured to perform the plurality of network functions. The functional module may be a software module, or may be a software/hardware module. This is not limited in the embodiments of this application.

For ease of description, the network function, and the network element, the device and the functional module that are configured to perform the network function, and a chip system disposed inside the network element and the device, are collectively referred to as network functions in the following.

It should be noted that the core network of the foregoing communications system may use an SBA. That is, the foregoing different network functions may communicate with each other based on a client/server mode. An NF service consumer is referred to as a client, and an NF service producer is referred to as a function server. Further, control plane network functions such as the access and mobility management function, the session management function, the policy control function, and the unified data management function may interact with each other through a service-based interface. For example, as shown in FIG. 1, a service-based interface provided by an access and mobility management function may be Namf, a service-based interface provided by a session management function may be Nsmf, a service-based interface provided by a policy control function may be Npcf, and a service-based interface provided by a unified data management function may be Nudm.

The access network device is a device that is located on a network side of the communications system and that has a wireless transceiving function, or a chip that can be disposed on the device. The access network device includes but is not limited to an evolved NodeB (eNB), a radio network controller (RNC), a NodeB (NB), a base station controller (BSC), a base transceiver station (BTS), a base station (for example, a home evolved NodeB, or a home Node B (HNB)), a baseband unit (BBU), an access point (AP) in a WI-FI system, a wireless relay node, a wireless backhaul node, a transmission and reception point (transmission and reception point (TRP) or transmission point (TP)), or the like. Alternatively, the network device may be a gNB or a transmission point (TRP or TP) in a 5G system such as a New Radio (NR) system, or one antenna panel or a group of antenna panels (including a plurality of antenna panels) of a base station in a 5G system, or may be a network node, such as a baseband unit (BBU) or a distributed unit (DU), that constitutes a gNB or a transmission point.

The user equipment is a terminal device that accesses the communications system and that has the wireless transceiving function, or a chip that can be disposed on the terminal device. The user equipment may also be referred to as a user apparatus, an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone, a tablet computer (IPAD), a computer with a wireless transceiving function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

It should be understood that FIG. 1 is merely a simplified schematic diagram of an example for ease of understanding. The communications system may further include another network device or may further include another terminal device that is not shown in FIG. 1.

To reduce a security risk of the foregoing communications system, the foregoing network repository function not only provides a registration function and a discovery function of the network function, but also integrates a function of an OAuth2.0 authorization server.

Figure 2:
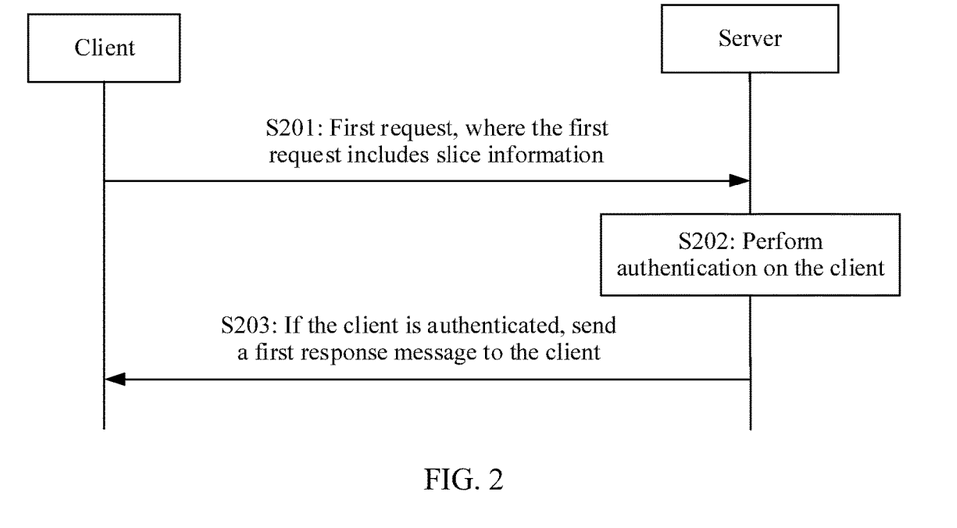
FIG. 2 is a schematic flowchart of a service authorization method based on a client/server model.

As shown in FIG. 2, an embodiment of the present disclosure provides a communication method based on the foregoing OAuth2.0 authorization service mechanism. The method includes the following steps.

S201: A first server receives a first request sent by a client.

It should be noted that the first server is an authorization server.

The first request is used to request an access token.

The first request includes slice information. The slice information is used to indicate a slice type to which the client belongs or a slice to which the client belongs.

For example, the slice information includes at least one of the following four types of information: S-NSSAI, a single network slice selection assistance information list, an NSI ID, or a network slice instance identifier list.

In addition, it should be further noted that the S-NSSAI is a slice type granularity, and the NSI ID further indicates a slice. For example, common slice types include a slice of an eMBB type, a slice of a URLLC type, and the like. For example, there are a plurality of instances in one type of slice, and each instance has an ID. A slice may be determined based on the ID of the slice.

Optionally, the first request message further includes at least one of the following parameters an expected service name and type, a client Id, a client function type, and a group identifier (Group ID).

Optionally, it should be noted that the slice information in the first request may be replaced with the group identifier. The group identifier is ID information of a group including a preset service of a preset function server. For example, the preset function server is a session management network element (or referred to as a session management server), and includes four services: a service 1, a service 2, a service 3, and a service 4. The service 1 and the service 2 form a first group, and the service 3 and the service 4 form a second group. If the client accesses the session management network element, the group identifier that needs to be accessed may be added.

In addition, it may be understood that before sending the first request to the first server, the client needs to register with the first server.

S202: The first server performs authentication on the client.

For example, an authentication manner may be performing the authentication according to the Transport Layer Security (TLS) protocol.

S203: If the client is authenticated, the first server sends a first response message to the client.

The first response message includes an access token, and the access token includes the slice information. In addition, it may be understood that, if the first request does not include the slice information, but includes the group identifier, the access token may include the group identifier. In addition, it should be further noted that, if the first request message includes both the slice information and the group identifier, the access token may include both the slice information and the group identifier.

In addition, it should be noted that the access token may further include other information, for example, an expected service name and type, an expiration date (the expiration date is used to indicate when the token expires), an instance identifier of the authorization server, and an instance identifier of the function server.

It can be learned from the foregoing that, according to the technical solutions provided in the present disclosure, the first server adds the slice information to the access token, to enable the client to access only the function server in the slice when performing function access using the access token. This ensures that the slices can be isolated from each other.

Figure 3:
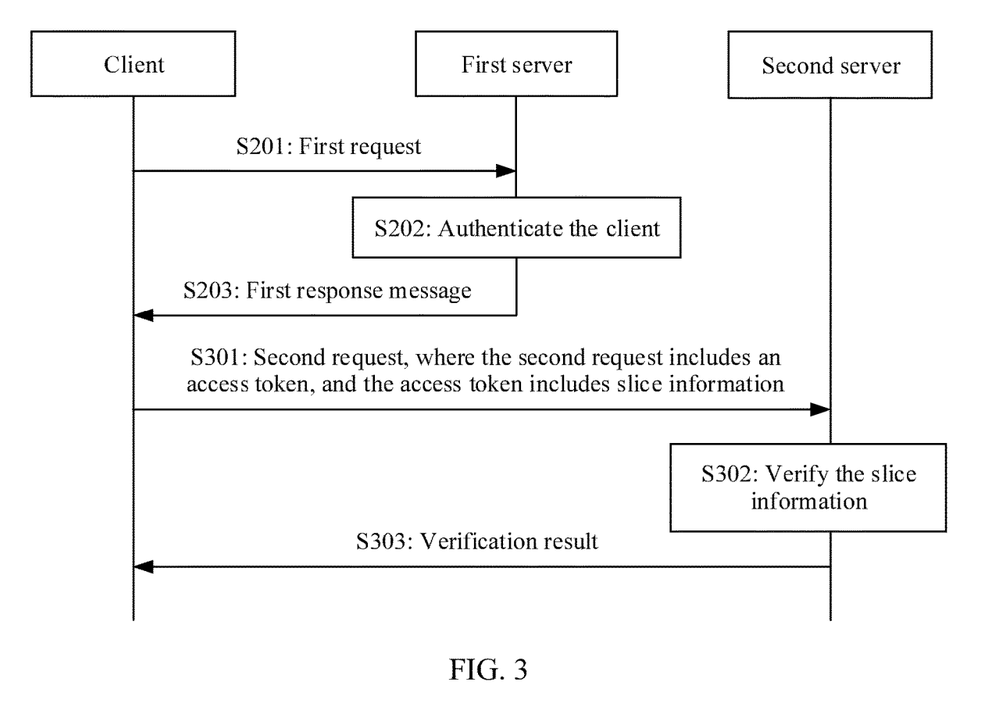
FIG. 3 is a schematic flowchart of another service authorization method based on a client/server model.

As shown in FIG. 3, based on FIG. 2, another embodiment of the present disclosure provides a service request method. The method includes the following steps.

S301: A client sends a second request to a second server.

The second server is a function server (NF service producer), and is configured to provide a function service. For example, the second server may be an AUSF, a UDM, a UPF, or the like.

The second request is used to request the function service.

The second request includes an access token. It may be understood that the access token is an access token issued by an authorization server.

S302: The second server verifies slice information in the access token.

For example, the second server may verify integrity of the second request, and may further verify the slice information or a group identifier. For example, verifying, by the second server, slice information in the access token includes that the second server determines whether the slice information in the access token matches slice information stored in the second server.

It may be understood that, if the slice information in the access token matches the slice information stored in the second server, it indicates that the second server and the client belong to a same slice or a same type of slices. In this case, verification on a slice dimension may succeed. On the contrary, if the slice information in the access token does not match the slice information stored in the second server, it indicates that the second server and the client do not belong to a same slice or a same type of slices. In this case, verification on a slice dimension fails.

Further optionally, the second server may verify an expiration date in the access token to determine whether the access token expires.

Further optionally, the second server may verify a service requested by the client, for example, determine whether the service requested by the client is beyond a service scope recorded in the access token.

In addition, it should be noted that, if there are a plurality of dimensions to be verified, the client can be notified to access the second server only after the plurality dimensions are successfully verified. For example, the plurality of dimensions may be understood as at least two dimensions. Common dimensions include a slice information dimension, an expiration date dimension, a service scope dimension, an integrity verification dimension of the second request, and the like.

S303: The second server sends a verification result to the client.

Therefore, it can be learned that according to the technical solution provided in this embodiment of the present disclosure, the second server verifies the slice information in the access token, to ensure that service access is performed in a same slice, and prevent another slice from accessing the function server. This ensures that slices are isolated from each other.

Figure 4:
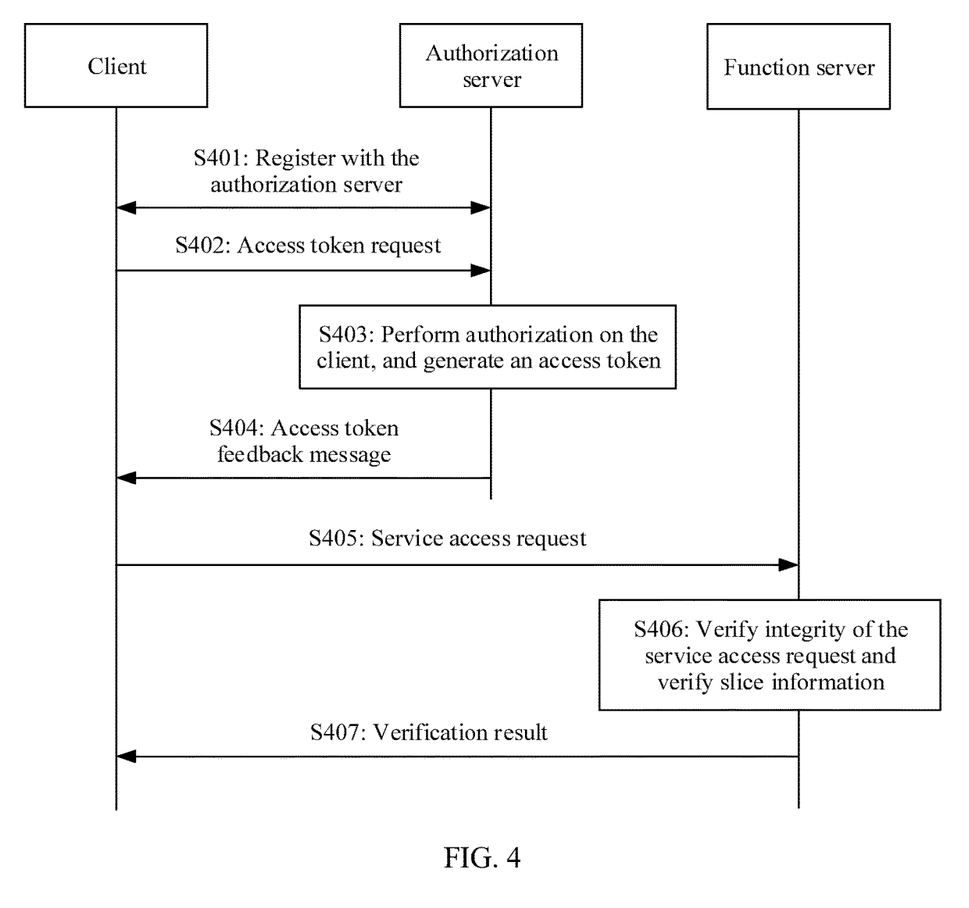
FIG. 4 is a schematic flowchart of another service authorization method based on a client/server model.

With reference to the content described in FIG. 2 and FIG. 3, as shown in FIG. 4, another embodiment of the present disclosure provides a service authorization method. For explanations of terms involved in this embodiment, refer to the foregoing embodiment. The method includes the following steps.

S401: A client registers with an authorization server.

S402: The client sends an access token request to the authorization server. The access token request includes slice information.

Optionally, the slice information may be replaced with a group identifier.

Optionally, the access token request further includes a group identifier.

S403: The authorization server performs authorization on the client, and generates an access token.

S404: The authorization server sends an access token feedback message to the client. The access token response message includes the access token, and the access token includes the slice information.

It should be noted that, if the access token request includes the group identifier instead of the slice information, the access token includes the group identifier.

Optionally, if the access token request further includes the group identifier, the access token should further include the group identifier.

S405: The client sends a service access request to a function server. The service access request includes the access token.

S406: The function server verifies integrity of the service access request and verifies whether the slice information matches slice information stored in the function server.

Optionally, if the access token further includes the group identifier, the function server further needs to verify the group identifier. For example, the function server matches the group identifier in the access token with a group identifier stored in the function server.

Optionally, the access token further includes declared authorization content, for example, an expected service name, an expiration date, and an instance identifier of the authorization server. The function server may also verify the declared authorization content.

S407: The function server sends a verification result to the client.

Therefore, it can be learned that according to the technical solution provided in this embodiment of the present disclosure, when generating the access token, the authorization server adds the slice information and/or the group identifier to the access token. When receiving the access token, the function server verifies the slice information and/or the group identifier in the token. This ensures that network elements that belong to a same slice can access each other, ensures isolation between slices, and further improves network security.

With reference to the technical solution described in FIG. 4, another embodiment of the present disclosure provides a roaming scenario. When an authorization server on a service network receives an access token request sent by a client, the authorization server on the service network performs authorization or authentication on the client. If the authorization or the authentication succeeds, the authorization server on the service network sends the access token request to an authorization server on a home network, where the access token request includes second slice information. Optionally, the access token request may also include first slice information. The second slice information is obtained through mapping based on the first slice information. After receiving an access token request message sent by the service network, the authorization server of the home network generates the access token based on S403 and S404. The token includes the second slice information and/or a group identifier. Further, the access token may also include the first slice information. The client accesses a function server on the home network based on the received access token. An access process is the same as that of S405 to S407.

For example, if a slice identifier corresponding to eMBB on the service network is a slice identifier 1, and a slice identifier corresponding to eMBB on the home network is a slice identifier 2, when the service network sends the access token request to the home network, the access token request needs to carry slice information. In this case, the slice identifier 2 needs to be obtained based on the slice identifier 1. Then, the slice identifier 2 is added to the access token request as the slice information. Optionally, the slice identifier 1 may also be added to the access token request.

The service authorization methods provided in the embodiments of this application are described above in detail with reference to FIG. 2 to FIG. 4. The following describes in detail communications apparatuses in the embodiments of this application with reference to FIG. 5 to FIG. 7.

Figure 5:
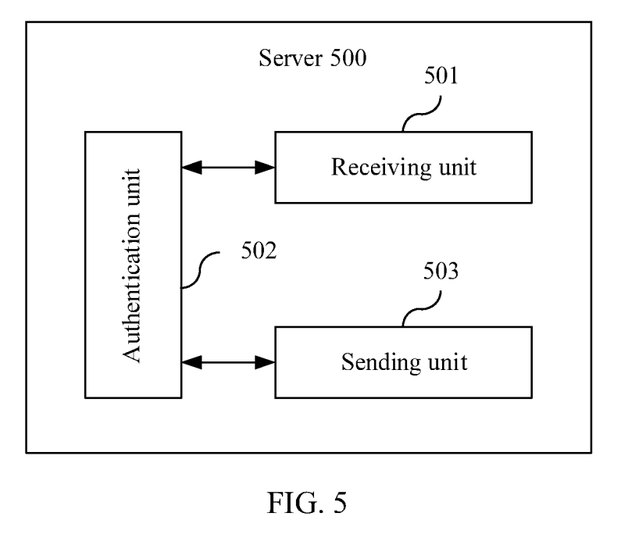
FIG. 5 is a schematic diagram of a structure of a server according to an embodiment of this application.

FIG. 5 is a schematic diagram of a structure of a server according to an embodiment of this application. The communications apparatus may be applicable to the system shown in FIG. 1, and perform a function of the first server in the foregoing method embodiment. For ease of description, FIG. 5 shows only main components of the communications apparatus. As shown in FIG. 1, the server 500 includes a receiving unit 501, an authentication unit 502, and a sending unit 503.

The receiving unit 501 is configured to receive a first request sent by a client. The first request is used to request an access token, and the first request includes slice information.

The authentication unit 502 is configured to authenticate the client.

The sending unit 503 is configured to send a first response message to the client if the client is authenticated. The first response message includes an access token, and the access token includes the slice information.

Optionally, the access token further includes an expected service name and type, a client identifier, and a client type. Certainly, the access token may further include a group identifier. Correspondingly, the first request may also include parameters listed above.

In addition, it should be further noted that the slice information is single network slice selection assistance information and/or a network slice instance identifier, or a single network slice selection assistance information list and/or a network slice instance identifier list.

In addition, it should be noted that the access token may not include the slice information, but includes the group identifier. Correspondingly, the first request should include the group identifier instead of the slice information.

Figure 6:
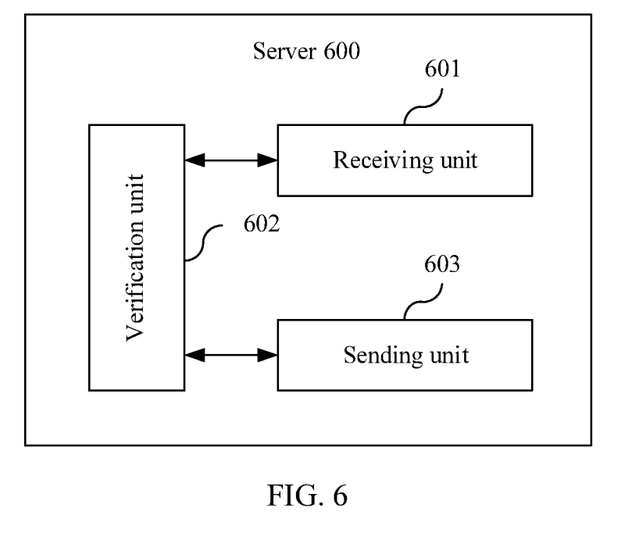
FIG. 6 is a schematic diagram of a structure of another server according to an embodiment of this application.

FIG. 6 is a schematic diagram of a structure of another server according to an embodiment of this application. The communications apparatus may be applicable to the communications system shown in FIG. 1, and perform a function of the second server in the foregoing method embodiment. For ease of description, FIG. 6 shows only main components of the communications apparatus. As shown in FIG. 6, the server 600 includes a receiving unit 601, a verification unit 602, and a sending unit 603.

The receiving unit 601 is configured to receive a second request sent by a client. The second request is used to request a function service, and the second request includes an access token.

The verification unit 602 is configured to verify slice information in the access token.

The sending unit 603 is configured to send a verification result to the client.

Optionally, it should be noted that the verification unit 602 is configured to determine whether the slice information in the access token matches slice information stored in the second server.

Figure 7:
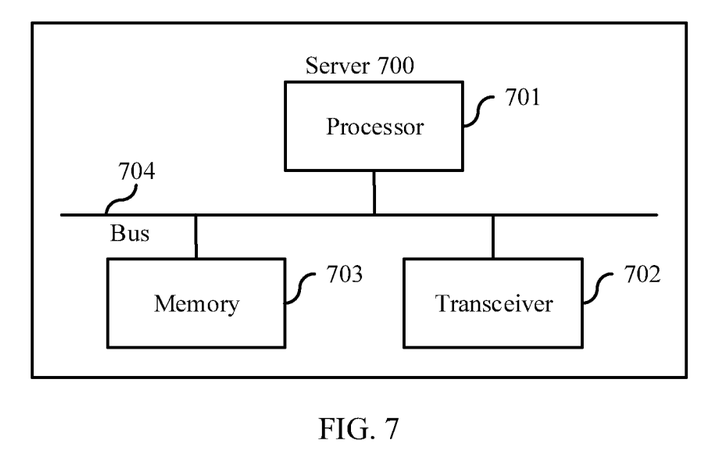
FIG. 7 is a schematic diagram of a physical structure of another server according to an embodiment of this application.

FIG. 7 is a schematic diagram of a physical structure of still another server according to an embodiment of this application. The communications apparatus may be applicable to the communications system shown in FIG. 1, and perform a function of the first server in the foregoing method embodiment, or perform a function of the second server in the foregoing method embodiment, or perform a function of the client in the foregoing method embodiment. For ease of description, FIG. 7 shows only main components of the communications apparatus.

As shown in FIG. 7, the server 700 includes a processor 701 and a transceiver 702. The processor 701 is coupled to a memory 703. For example, the processor 701 is connected to the memory 703 through a bus 704. The processor 701 is configured to execute a computer program stored in the memory 703, to enable the server 700 to perform the function of the client in the foregoing method embodiment, or perform the function of the first server or the second server in the foregoing method embodiment.

An embodiment of this application provides a communications system. The communications system includes the foregoing client and the foregoing first server.

An embodiment of this application provides a communications system. The communications system includes the foregoing client and the foregoing second server.

An embodiment of this application provides a communications system. The communications system includes the foregoing client, the foregoing first server, and the foregoing second server.

An embodiment of this application provides a computer-readable storage medium. The computer-readable storage medium stores a program or an instruction. When the program or the instruction is run on a computer, the computer is enabled to perform the method described in the foregoing method embodiments.

An embodiment of this application provides a computer program product, including computer program code. When the computer program code is run on a computer, the computer is enabled to perform the method described in the foregoing method embodiments.

It should be understood that, in the embodiments of this application, the processor may be a central processing unit (CPU), or may alternatively be another general-purpose processor, a digital signal processor (DSP), an application-specific integrated circuit (ASIC), a field-programmable gate array (FPGA), or another programmable logical device, a discrete gate or transistor logical device, a discrete hardware component, or the like. The general-purpose processor may be a microprocessor, or the processor may be any conventional processor or the like.

It may be understood that, in the embodiments of this application, the memory may be a volatile memory or a nonvolatile memory, or may include a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a random-access memory (RAM), used as an external cache. Through example but not limitative description, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchronous link dynamic RAM (SLDRAM), and a direct rambus (DR) DRAM.

All or some of the foregoing embodiments may be implemented by means of software, hardware (for example, circuit), firmware, or any combination thereof. When software is used to implement the embodiments, all or some of the foregoing embodiments may be implemented in a form of a computer program product. The computer program product includes one or more computer instructions or computer programs. When the program instructions or the computer programs are loaded and executed on a computer, the procedures or functions according to the embodiments of this application are all or partially generated. The computer may be a general-purpose computer, a dedicated computer, a computer network, or other programmable apparatuses.

The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: only A exists, both A and B exist, and only B exists. A and B may be singular or plural. In addition, the character "/" in this specification usually represents an "or" relationship between the associated objects, or may represent an "and/or" relationship. A specific meaning depends on a context.

In this application, "at least one" means one or more, and "a plurality of" means two or more. "At least one item (piece) of the following" or a similar expression thereof means any combination of these items, including a singular item (piece) or any combination of plural items (pieces). For example, at least one item (piece) of a, b, or c may represent: a, b, c, a and b, a and c, b and c, or a, b, and c, where a, b, and c may be singular or plural.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the other approaches, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A service authorization method comprising:
   receiving, by a first server, a first request from a client that is a network element for performing a network function in a core network deployed using a service-based architecture, wherein the first request requests an access token, and wherein the first request comprises first slice information, and wherein the first slice information comprises a network slice instance (NSI) identifier (ID) list or a single network slice selection assistance information (S-NSSAI) list;
   performing, by the first server, authentication on the client;
   sending, by the first server, a first response message to the client when the client is authenticated, wherein the first response message comprises the access token, and wherein the access token comprises the first slice information;
   receiving, by a second server, a second request from the client, wherein the second request requests a function service, and wherein the second request comprises the access token;
   verifying, by the second server, the first slice information to obtain a verification result; and
   replying, by the second server, to the client based on the verification result.

2. The service authorization method of claim 1, wherein the access token further comprises an expected service name and type, a client identifier, and a client type.

3. The service authorization method of claim 1, wherein verifying the first slice information comprises determining, by the second server, whether the first slice information matches second slice information stored in the second server.

4. A service authorization system comprising:
   a first server configured to:
      receive, from a client that is a network element for performing a network function in a core network deployed using a service-based architecture, a first request requesting an access token, wherein the first request comprises first slice information, and wherein the first slice information comprises a network slice instance (NSI) identifier (ID) list or a single network slice selection assistance information (S-NSSAI) list;
      perform authentication on the client; and
      send a first response message to the client when the client is authenticated, wherein the first response message comprises the access token, and wherein the access token comprises the first slice information;
   a second server in communication with the first server and configured to:
      receive, from the client, a second request requesting a function service, wherein the second request comprises the access token;
      verify the first slice information to obtain a verification result; and
      reply to the client based on the verification result; and
   a hardware processor configured to implement the first server or the second server.

5. The service authorization system of claim 4, wherein the access token further comprises an expected service name and type, a client identifier, and a client type.

6. The service authorization system of claim 4, wherein the second server is further configured to verify the first slice information by determining whether the first slice information matches second slice information stored in the second server.

7. A service authorization method implemented by a server and comprising:
   receiving, from a client that is a network element for performing a network function in a core network deployed using a service-based architecture, a request requesting an access token, wherein the request comprises slice information, and wherein the slice information comprises a network slice instance (NSI) identifier (ID) list or a single network slice selection assistance information (S-NSSAI) list;
   performing authentication on the client; and
   sending a response message to the client when the client is authenticated,
   wherein the response message comprises the access token, and
   wherein the access token comprises the slice information.

8. The service authorization method of claim 7, wherein the access token further comprises an expected service name and type, a client identifier, and a client type.

9. A service request method implemented by a server and comprising:
   receiving, from a client that is a network element for performing a network function in a core network deployed using a service-based architecture, a request requesting a function service, wherein the request comprises an access token, wherein the access token comprises first slice information, and wherein the first slice information comprises a network slice instance (NSI) identifier (ID) list or a single network slice selection assistance information (S-NSSAI) list;

verifying the first slice information to obtain a verification result; and replying to the client based on the verification result.

10. The service request method of claim 9, wherein verifying the first slice information comprises determining whether the first slice information matches second slice information stored in the server.

11. A server comprising:
a receiver configured to receive a request from a client that is a network element for performing a network function in a core network deployed using a service-based architecture, wherein the request requests an access token, wherein the request comprises slice information, and wherein the slice information comprises a network slice instance (NSI) identifier (ID) list or a single network slice selection assistance information (S-NSSAI) list;
a processor coupled to the receiver and configured to authenticate the client; and
a transmitter coupled to the processor and configured to send a response message to the client when the client is authenticated,
wherein the response message comprises the access token, and
wherein the access token comprises the slice information.

12. The server of claim 11, wherein the access token further comprises an expected service name and type, a client identifier, and a client type.

13. A server comprising:
a receiver configured to receive a request from a client that is a network element for performing a network function in a core network deployed using a service-based architecture, wherein the request requests a function service, wherein the request comprises an access token, wherein the access token comprises first slice information, and wherein the first slice information comprises a network slice instance (NSI) identifier (ID) list or a single network slice selection assistance information (S-NSSAI) list;
a processor coupled to the receiver and configured to verify the first slice information to obtain a verification result; and
a transmitter coupled to the processor and configured to reply to the client based on the verification result.

14. The server of claim 13, wherein the processor is further configured to verify the first slice information by determining whether the first slice information matches second slice information stored in the server.

15. The service authorization method of claim 1, wherein the NSI ID list comprises at least one slice.

16. The service authorization method of claim 1, wherein the S-NSSAI list comprises at least one slice type granularity.

17. The service authorization system of claim 4, wherein the NSI ID list comprises at least one slice.

18. The service authorization system of claim 4, wherein the S-NSSAI list comprises at least one slice type granularity.

19. The service authorization method of claim 7, wherein the NSI ID list comprises at least one slice.

20. The service authorization method of claim 7, wherein the S-NSSAI list comprises at least one slice type granularity.

* * * * *